Jan. 1, 1963

C. R. KUZELL ET AL 3,071,454

APPARATUS FOR REFORMING GASES

Filed Aug. 4, 1960

Jan. 1, 1963 — C. R. KUZELL ET AL — 3,071,454
APPARATUS FOR REFORMING GASES
Filed Aug. 4, 1960 — 3 Sheets-Sheet 2

United States Patent Office 3,071,454
Patented Jan. 1, 1963

3,071,454
APPARATUS FOR REFORMING GASES
Charles R. Kuzell, Phoenix, Morris G. Fowler, Douglas, Leonard Klein, Scottsdale, and John H. Davis, Jr., Douglas, Ariz., assignors to Phelps Dodge Corporation, New York, N.Y., a corporation of New York
Filed Aug. 4, 1960, Ser. No. 47,444
5 Claims. (Cl. 48—196)

This invention relates to gas reforming and more particularly to apparatus for reforming natural gas to produce a gas having gaseous components different from those initially present in the natural gas.

When gases such as natural gas, or other combustible hydrocarbon gases of similar nature, are burned under certain conditions with insufficient air to carry the combustion to completion the gas is reformed and the hydrocarbon components may be caused to be reformed to produce a reformed gas containing substantial amounts of other gaseous components such as hydrogen, and carbon monoxide. The reformed gases containing hydrogen ($H_2$) and carbon monoxide (CO) are known to be more suitable for carrying out certain desired reducing reactions than the natural gas itself or the other hydrocarbon gases of similar nature in their initial or "raw" (unreformed) state. Consequently, it is often desired to produce such reformed reducing gases when a subsequent gaseous reduction reaction is to be carried out. This is particularly true in the metallurgical and metal refining arts, although the reformed gas may be effectively used in other industrial arts and processes.

This invention provides a method and apparatus admirably suited to produce reformed gas containing desired, substantial amounts of CO and $H_2$ from hydrocarbon gases, such as natural gas, in which these very reactive reducing gases are not initially present in the raw gas.

For convenience of description, the invention will be described in connection with reforming natural gas, but it will be understood that the invention is not confined to the treatment of natural gas, since the apparatus may be useful in reforming other hydrocarbon gases of similar kind. Also, the natural gas which is charged to the apparatus for reforming is, for convenience of description, referred to herein as "raw" gas, although it may have been subjected to previous treatment such, for example, as chemical or other treatment for the purpose of removing sulfur or other constituents which may be considered as impurities or, at least, not wanted in the final reformed gas product.

According to the invention there is provided a reaction chamber containing a suitable catalyst, and a carburetor of particular design and construction for mixing cold or preheated raw hydrocarbon gas with a predetermined and controlled quantity of cold or preheated air and for introducing the air-gas mixture into the reaction chamber wherein is brought about a desired but incomplete combustion of the hydrocarbon components of the raw gas so that the carbon content is reformed to free CO which becomes a component in the final reformed gas product and the hydrogen content of the raw hydrocarbon gas in combined form is reformed to free $H_2$ which is also a component of the final product. The nitrogen of the air, being inert, remains as such in the final product.

The carburetor is of novel construction and is connected to the reaction chamber and arranged in such manner that backfiring, which was a drawback in prior known burners or mixers, is eliminated. Furthermore, the arrangement of the reaction chamber, its contained catalyst and the carburetor is such that unwanted carbon formation in the catalyst chamber is eliminated, this unwanted carbon formation having always been a serious drawback in prior art practice.

Although the novel features which are believed to be characteristic of the invention are pointed out in the annexed claims, the invention itself as to its objects and advantages and the manner in which it may be carried out may be better understood by reference to the following description taken in connection with the accompanying drawings, forming a part hereof, in which FIG. 1 is a view in elevation and partly diagrammatic of apparatus embodying our invention;

FIG. 5 is a view on line 5—5 of FIG. 2;

FIG. 6 is a view in elevation of the carburetor on line 6—6 of FIG. 1; and

FIG. 7 is a view in section on line 7—7 of FIG. 6.

Figure 1:
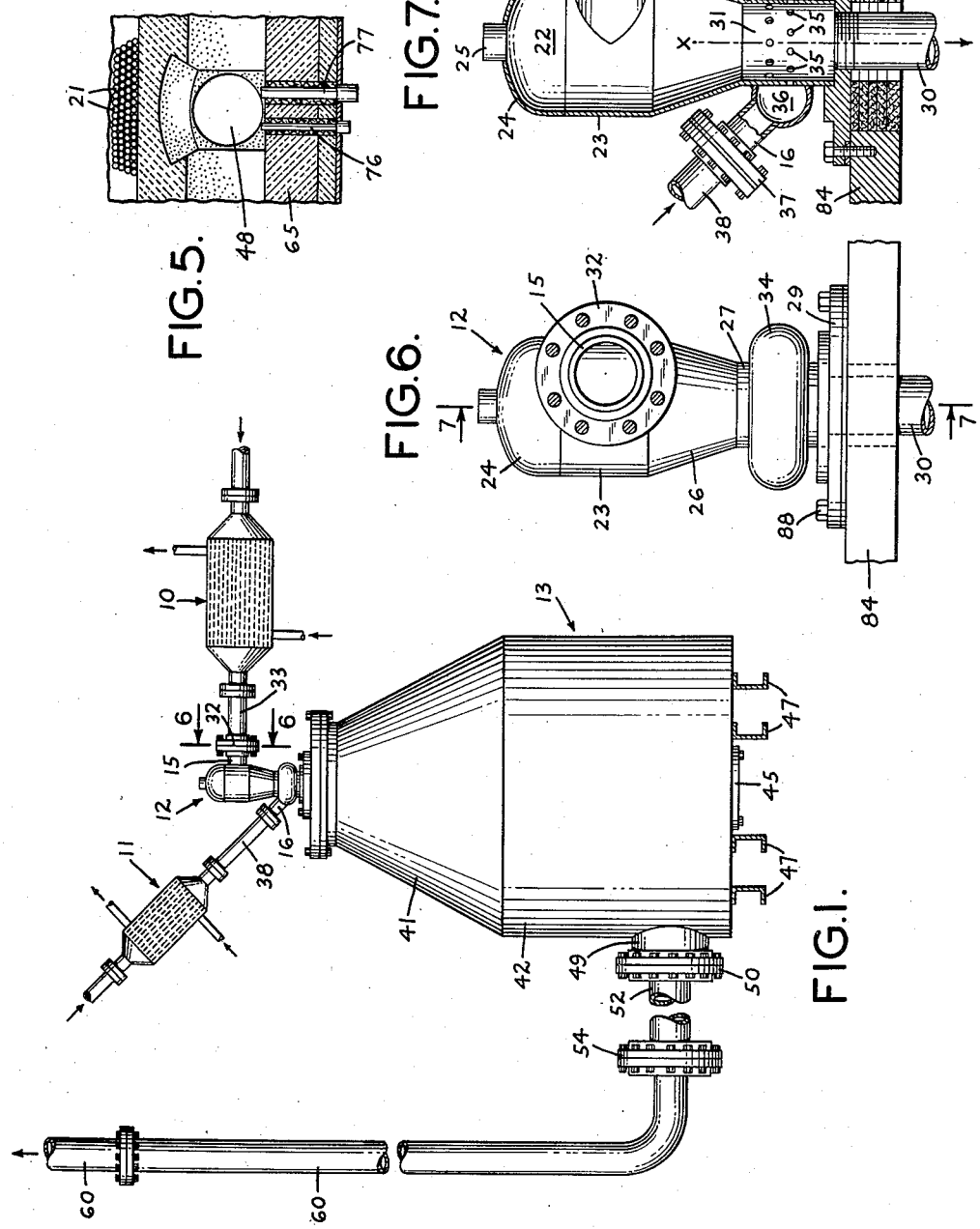
Figure 2:
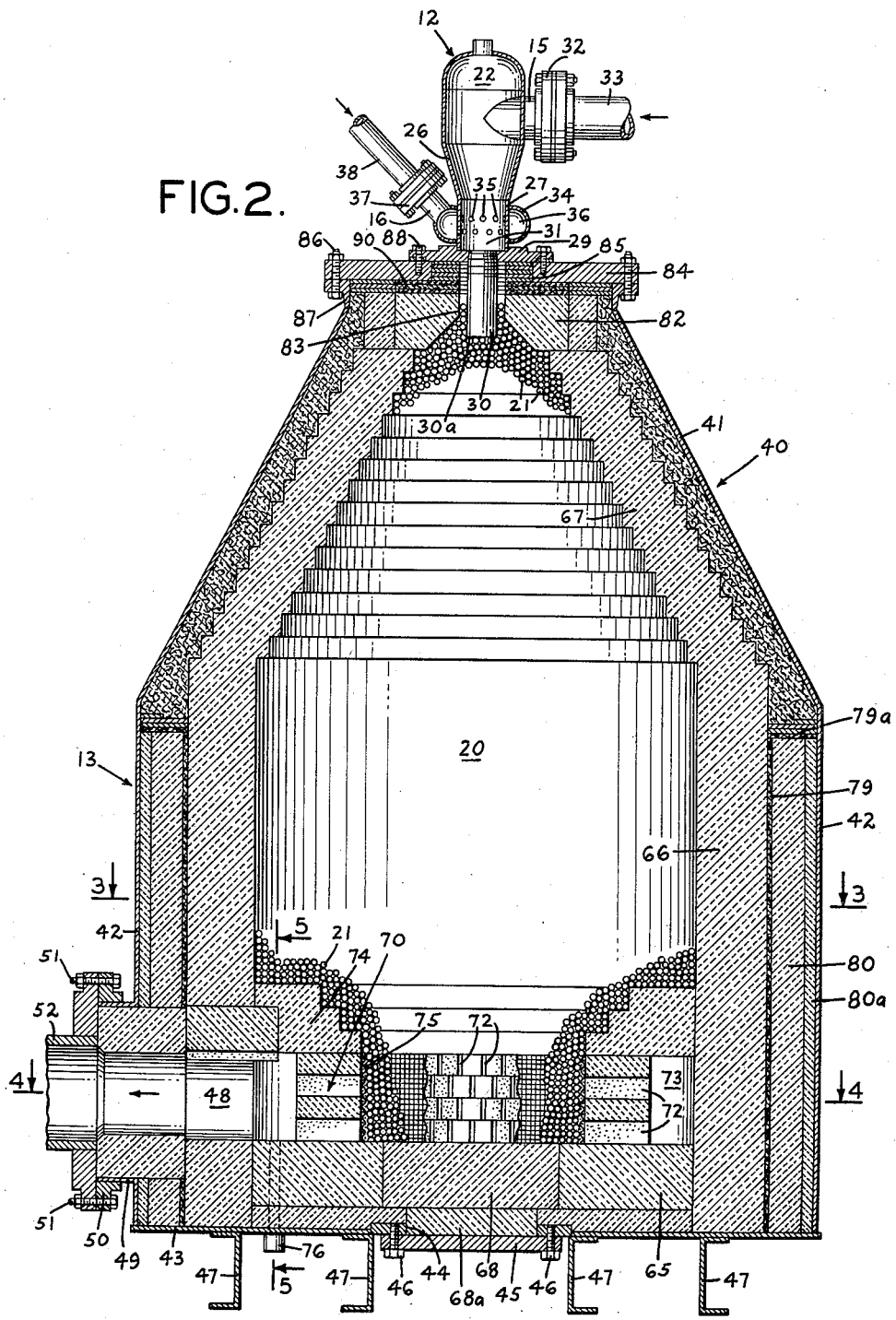
FIG. 2 is a view in section and to larger scale of the furnace or catalytic chamber and the carburetor connected thereto.
Figure 3:
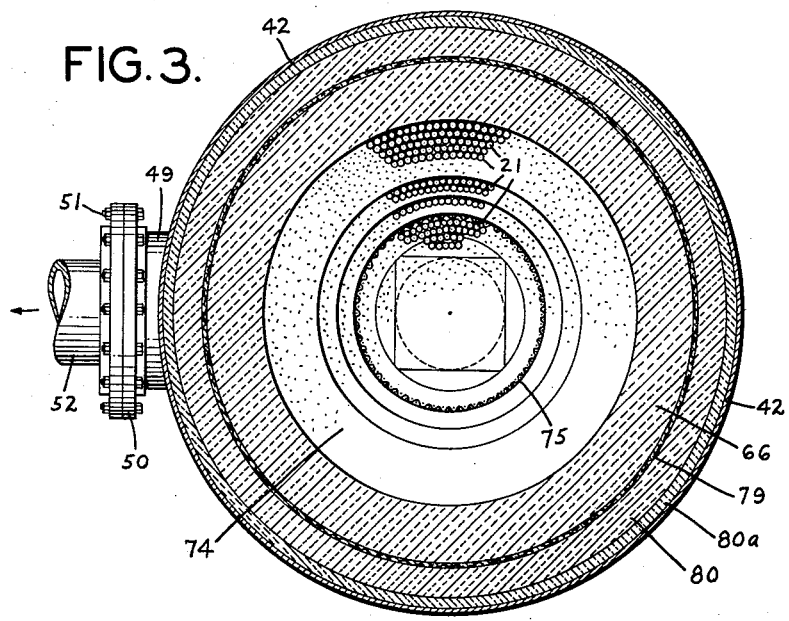
FIG. 3 is a view on line 3—3 of FIG. 2.
Figure 4:
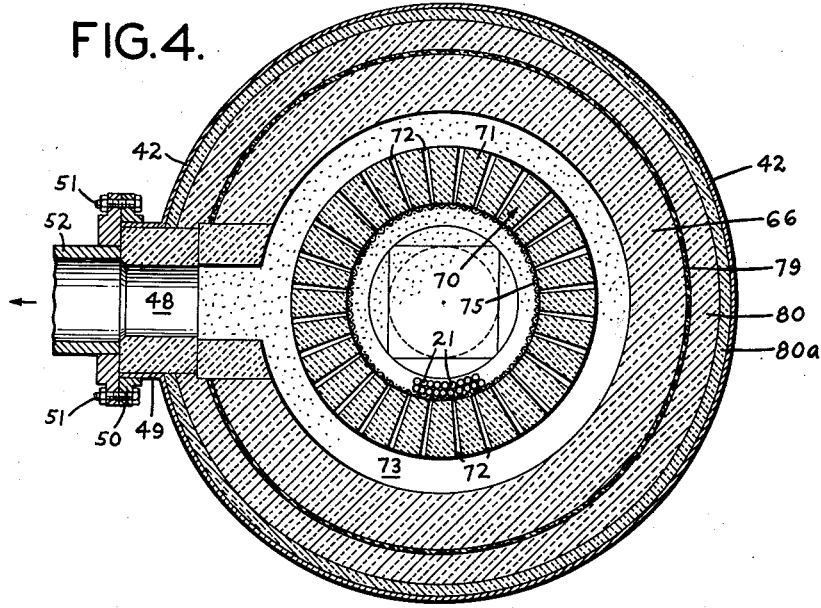
FIG. 4 is a view on line 4—4 of FIG. 2.

Referring now to the drawings, in which like reference characters throughout the several views indicate like parts, the apparatus, as shown, comprises a carburetor 12 into which the air and raw gas are intermixed and a reaction furnace 13 providing a reaction chamber 20 containing catalyst 21 into which the air and hydrocarbon gas mixture is passed and in which the hydrocarbon gas is reformed.

Air is delivered to the carburetor 12 through an air inlet conduit 15 and raw natural gas is delivered to the carburetor through a gas inlet conduit 16. An air preheater 10 (shown conventionally) of known construction and of a kind which will heat atmospheric air passed therethrough to a temperature up to 1600° F. or higher, may be used to improve reformed gas composition. Likewise the preheater 11 (shown conventionally) of known construction and of a kind which will preheat the natural gas to a temperature up to 1000° F., or higher, may be used to improve reformed gas composition and elevate its temperature. It will be understood that the air is drawn from the atmosphere and the natural gas is supplied from a suitable source.

The carburetor 12 may be made of any suitable material but preferably and, as shown, is stainless steel. It comprises a cyclone type of air inlet chamber 22. The air chamber 22 is bounded by a cylindrical wall 23 closed at its upper end by a dome-shaped cap portion 24 having an access hole 25 closed during reforming operation. Extending downwardly from the cylindrical sidewall portion 23 is a tapered portion 26 in the form of a truncated cone. Extending downwardly from the lower, and smaller, end of the truncated cone portion 26 is a cylindrical air-gas mixing chamber portion 27 of a diameter smaller than the diameter of the air inlet chamber 22. The lower end of the mixing chamber portion 27 is secured, as by welding, in a suitable aperture 28 in the center of a carburetor mounting flange 29. An air-gas mixture conduit comprising a pipe nipple 30, threaded at its upper end, is screwed into a female threaded bore in the carburetor mounting flange. This air-gas conduit provides communication between the air-gas mixture chamber 31 provided by the cylindrical portion 27 and delivers the air-gas mixture into the reaction chamber. The air-gas delivery conduit 30, as described in further detail hereinafter, extends into the catalyst mass in the reaction chamber 20.

The air inlet conduit 15, which communicates with air chamber 22, is secured to the side wall 23 and is placed in tangent position so that air forced through conduit 15 will be given a swirling or cyclone motion as it passes through chamber 22 into the air-gas mixing chamber 31. Air inlet conduit 15 is provided with a flange 32 for connection to the air conduit 33 from the air source.

The raw gas inlet 16 communicates with an annular gas conduit 34 extending around the cylindrical wall 27 of the air-gas mixing chamber 31. A plurality of apertures, or ports, in the form of two rows of circumferentially spaced bores 35 in the wall 27 provide communication between the annular gas chamber 36 and the air-gas mixing chamber 31. The gas inlet conduit 16 is provided with a flange 37 for connecting it to the gas delivery conduit 38 from the gas source.

It may now be observed that the air passing through chamber 22 is given a swirling motion by reason of the tangential position of air inlet conduit 15. The swirling air as it passes through chamber 31 is intimately intermixed with gas which passes from the annular gas chamber 36 through the manifold bores 35 which have been sized and arranged to maintain gas velocity at not less than 22,300 s.f.p.m. through each bored hole 35. It is to be noted that the direction of flow of the gas through the ports 35 is at right angles to the center axis X of the chamber 31. By reason of this intimate mixing of air and gas in mixing chamber 31, the mixture of air and gas is uniform as it passes through the conduit 30 into the catalytic reaction chamber 20. To prevent combustion of the air and gas mixture within the conduit 30, the size of the conduit is selected so that velocity of the air-gas mixture will not be less than 17,000 s.f.p.m. It is to be noted the calculations of velocities mentioned are based on flow of gas at standard conditions of 14.7 pounds per square inch absolute and at 60 degrees Fahrenheit temperature.

The furnace 13 which provides catalytic reaction chamber 20 comprises, in general, a steel shell 40 lined with suitable insulating material. It may be roughly described as pear shaped in that its upper portion 41 is in the shape of a truncated cone and its lower portion is in the form of a cylindrically shaped portion 42, closed at the bottom by a circular steel plate 43 having an access manhole 44 in its center covered by a removable manhole cover plate 45, removably secured in place by cap screws 46. The furnace rests upon suitable steel structural members 47. A reformed gas discharge tunnel, or passageway, 48, described later, is provided in the lower end of the furnace. An opening in the cylindrical wall 42 to which is welded a short cylindrical neck 49 of plate steel provides means for securing a circular flange 50 to which is fastened, by bolts 51, a flanged reformed gas discharge steel pipe, or conduit, 52. The reformed gas discharge conduit 52 has a flange 54 (see FIG. 1) which provides means for connection to a delivery pipe 60 which may carry the reformed gas to the place it is to be used or to a storage tank or container.

Referring again to the furnace 13, the steel shell is lined with insulating material to provide the insulated reaction chamber 20. Although ceramic or refractory material has been commonly used in reaction chambers for reforming natural gas, we prefer to line a considerable portion of the furnace with various forms of insulating material which we have found to be better suited to provide for expansion and contraction of the parts in the various zones of the reaction furnace.

The bottom and side walls of the reaction chamber adjacent the catalytic chamber space 20 are lined with insulation brick, the sizes and shapes of which are selected to provide a bottom wall 65, a cylindrical side wall 66 and an upwardly tapered, or conically shaped side wall 67 in the upper end of the furnace. This insulation brick adjacent the chamber space is of the type of porous clay insulating bricks, made of fireclay or kaolin. We have found that insulation brick now available in the market with maximum temperature resistance of 2800 degrees F. is satisfactory. The bottom wall 65 within the circle defined by the cylindrical side wall 66 has a removable section 68, 68a immediately above the manhole plate 45 to provide access to the chamber space 20. The catalyst balls 21 may, if desired, be removed through the manhole.

The reaction chamber is reduced in diameter at its lower end to provide a foraminous annular wall 70 at the bottom of the chamber. The annular foraminous wall provides ample passageways for the reformed gas produced in the catalytic reaction chamber to pass out of the chamber. This annular foraminous wall is constructed of sector shaped burned firebricks 71 laid up in staggered or overlapping fashion to provide radial spaces or passageways 72 leading from the chamber 20 into an annular tunnel 73 which communicates with the radial discharge tunnel 48. It will be noted that a wall portion 74 of burned firebrick overlies the annular foraminous wall 70. A cylindrical stainless steel screen 75 with No. 2 mesh openings lies adjacent the interior face of the foraminous brick wall to prevent movement of the catalyst balls 21 to a place where they might unduly restrict the flow of gas into annular tunnel 73. A thermometer well 76 and sample removal well 77 communicating with the discharge tunnel 48 are positioned in the bottom wall.

To provide for expansion and contraction of the parts, a layer 79 of blanket insulation material resistant to 2000 deg. F. of 12 lbs. per cu. ft. density is positioned between the exterior surface of brick wall 66 and an outside insulating brick wall 80, 80a which lies at the interior surface of the cylindrical steel plate portion 42 of the furnace, it being noted also that a flat ring 79a of blanket insulation material rests upon the upper annular edge of the wall 80, 80a. Insulation material now available in blanket form and sold under the brand name or trademark "Cerafelt," is satisfactory. The annular conical space between the steel portion 41 and the tapered brick wall 67 is filled to a density of 6 to 12 lbs. per cu. ft. with a fluffy bulk insulation material of air blasted aluminum silicate. Insulation material in bulk form now available and sold under the brand name or trademark "Fiberfrax" is satisfactory.

Mounted on the upper annular surface of the brick wall 67 is a circular cap 82 made of sector shaped insulation brick, the cap 82 having a central opening 83 through which the carburetor air-gas discharge nipple 30 extends. The lower end of the central opening is flared outwardly to provide space to be occupied by catalyst balls to surround the lower end the carburetor outlet nipple.

A circular steel cover plate 84 having a central opening 85 is removably mounted on the top of the furnace by means of bolts 86 which extend through a flanged mounting ring 87 secured to the top of conical portion 41 of the furnace steel shell 40. The carburetor 12 is removably secured to the furnace cover plate 84 by means of cap screws 88 extending through the carburetor mounting flange 29. To provide for expansion and contraction of the steel and the insulation brick, insulation material 90 of fiber glass or ceramic fiber type in blanket form similar to side insulation material 79 is mounted between the steel cover plate 84 and cap 82.

Although there are other suitable catalysts, we prefer to use nickelized alumina balls 21 which, as shown, have a diameter of approximately ½ to 1½ inch. The balls may be charged to the reaction chamber space 20 through the central opening 85 in the top of the furnace. They may be removed, if desired, through manhole 44. A sufficient quantity of catalyst balls 21 are placed in the reaction chamber to fill it completely. It is to be particularly observed that the catalyst balls extend a substantial distance above the outlet opening 30a of the air-gas discharge conduit 30 of the carburetor. This is of particularly significance in our method to insure that the air-gas mixture contacts the catalyst instantaneously after the air and gas are intimately intermixed. The arrangement, as shown, provides such contact of the air-gas mixture with the catalyst instantaneously or as nearly thereto as is physically possible within the limits of apparatus of commercial size.

The entire furnace and its component parts are sized in such manner that the resulting catalytic reaction chamber will afford approximately $\frac{1}{10}$ cu. ft. of volume for each standard cu. ft. per minute reformed gas to be produced.

The apparatus may be operated as follows: the raw gas to be reformed may be any suitable natural gas, such for example, as the natural gas from the New Mexico and Texas fields. The following is an analysis of natural gas.

| Component: | Volumetric content, percent |
|---|---|
| Methane—$CH_4$ | 83.40 |
| Ethane—$C_2H_6$ | 9.40 |
| Propane—$C_3H_8$ | 2.29 |
| Butane—$C_4H_{10}$ (normal) | 0.13 |
| Butane—$C_4H_{10}$ (iso) | 0.16 |
| Pentane—$C_5H_{12}$ | 0.21 |
| Nitrogen—$N_2$ | 4.07 |
| Carbon Dioxide—$CO_2$ | 0.31 |
| Oxygen—$O_2$ | 0.03 |

The calculated molecular weight is 18.79 and the calculated formula is

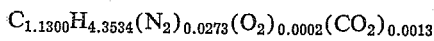

$$C_{1.1300}H_{4.3534}(N_2)_{0.0273}(O_2)_{0.0002}(CO_2)_{0.0013}$$

It should be understood that the composition of natural gas varies from time to time and from place to place and that the relative proportions of the individual components may vary substantially from those quoted above.

In order to produce reformed gas containing substantial amounts of CO and $H_2$, the natural gas is reacted with a quantity of oxygen (introduced as air from the atmosphere) insufficient in amount to burn the gas completely to $CO_2$ and $H_2O$. Hence, air (considered as 79% $N_2$ and 21% $O_2$), in an amount substantially insufficient to oxidize the gas completely to $CO_2$ and $H_2O$, is forced into the air chamber 22 of carburetor 12 through the inlet pipe 15 and the natural gas is forced through the inlet pipe 16 into annular space 36, thence through the ports 35 at right angles to the vertical axis of the mixing chamber 31 into the swirling current of air passing through this chamber where the air and gas are thoroughly mixed. The mixture of gas and air then passes through inlet conduit 30 impacting almost instantly on the closely adjacent catalytic mass of nickelized alumina balls 21 which fill the reaction chamber as completely as possible and surround the carburetor exit port 30.

Depending upon the usage to which the reformed gas is to be put, it has been found that air-reforming of natural gas may be effectuated under two different conditions, those being:

I. Preheating of both air and natural gas; and
II. Preheating of the air only.

In general, to produce the best grade of reformed gas coupled with the highest final temperature of same, preheating of both air and gas must be accomplished. On the other hand, when substantially less than maximum grade of reformed gas at substantially lower outlet temperatures may be utilized successfully in a commercial plant, then it may be desirable and economical to preheat only the air.

Even though the reforming reaction may be considered as fairly exothermic, additional heat is necessary to maintain the reaction, due to heat losses by radiation, etc., and to insure, when so required, high temperature finished reformed gas. This additional heat is generated within the reformer by means of a slightly higher air/gas ratio, which will produce slightly greater amounts of $CO_2$ and $H_2O$ with proportionately less CO and $H_2$, respectively.

Theoretically, natural gas requires about 2.7 volumes of air per volume of natural gas to produce the maximum volume of CO and $H_2$ therefrom. Because of the above mentioned need for additional evolution of heat in the reformer, it has been found preferable to use an air/gas ratio from 2.8 up to 3.0 and infrequently slightly higher, depending entirely on operating conditions and requirements. On rare occasions, it may be advisable to operate without preheat of either air or gas for short periods of time, in which case a lower grade ($CO+H_2$) of the reformed gas is produced and a much larger portion of the original hydrocarbons remains unreacted.

The following table gives actual commercial plant data when operating for long periods of time under the two above-mentioned preferable conditions of preheating:

| | I | II |
|---|---|---|
| Vol. Air, cu. ft./hr | 12,309 | 25,000 |
| Vol. Gas, cu. ft./hr | 4,222 | 8,500 |
| Air/Gas Ratio | 2.92 | 2.94 |
| Temp. of Air, °F | 1,245 | 1,015 |
| Temp. of Natural Gas, °F | 1,008 | (1) |
| Reformed Gas: | | |
| $CO_2$, percent | [2] 1.02 | 1.31 |
| CO | 18.05 } 50.49 | 17.81 } 50.85 |
| $H_2$ | 32.44 | 33.04 |
| $H_2O$ | 2.96 | 2.16 |
| $CH_4$ | 0.36 | 0.48 |
| $N_2$ | 45.17 | 45.20 |
| Cu. Ft./Min | 363 | 728 |
| Temp., °F | 1,804 | 1,452 |

[1] No Preheat.
[2] By volume.

In Case I a small reformer was operated with both air and gas preheated. In Case II, a larger reformer was operated with only the air preheated. We have found that with the apparatus as described using a reaction furnace having 92 cu. ft. of catalyst chamber and charged with 11,000 lbs. of ½ to 1½ inch alumina balls impregnated with 6½ percent Ni, preheating only the air, that reformed gas can be produced in accordance with Case II above described.

It is particularly significant to note that in our process the air and gas immediately after they are intermixed, are introduced instantaneously into direct contact with the catalyst mass. And it will be observed that the nickelized alumina catalyst balls extend up and around the air-gas delivery conduit 30 to avoid all possible delay in contacting the reacting gases with the catalyst. Also the reaction chamber is of small cross section at the point of entry of the air-gap mixture so that the velocity of flow at the upper end of the chamber adjacent the delivery conduit 30 is not reduced rapidly but is maintained to force the reacting gases downwardly and quickly into the catalyst mass where the velocity of flow is decreased in order to give the reaction time to be accomplished.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In a hydrocarbon gas reformer apparatus, a reaction chamber having a top end portion of generally conical shape increasing in cross section in a downward direction, a generally cylindrical portion below said top end portion and a bottom, said conically shaped top end portion and cylindrical portion being filled with catalyst mass, a carburetor mounted on said reaction chamber above said conically shaped portion for intermixing air with raw hydrocarbon gas to be reformed and for introducing the intermixed air and gas mixture into said reaction chamber, said carburetor comprising an air inlet chamber having a cylindrical side wall, an air inlet conduit mounted at an angle to the cylindrical side wall of said air inlet chamber and leading into said air inlet chamber whereby air passed under pressure through said air inlet conduit is given a swirling motion in said air inlet chamber as said air is passed through said air inlet chamber, an air-gas mixing chamber having a cylindrical side wall connected to said air inlet chamber in coaxial alignment through which is passed the air passed through said air inlet chamber, a gas inlet chamber surrounding said air-gas mixing chamber, a gas inlet conduit connected to said gas inlet chamber, circumferentially spaced apertures in the cylindrical side wall of said air-gas mixing chamber providing communication ports between said air-gas mixing chamber and said gas inlet chamber whereby raw hydrocarbon gas passed through said ports is intimately intermixed in said air-gas mixing chamber with air passed therethrough from said air inlet chamber, an air-gas discharge conduit communicating with said air-gas mixing chamber and mounted in coaxial alignment therewith through which the air-gas mixture is passed, said air-gas discharge conduit having an open discharge end and extending downwardly into said reaction chamber with its open discharge end in contact with said catalyst mass but terminating within said conically shaped upper end portion, and a reformed gas discharge conduit connected with said reaction chamber near its bottom through which reformed gas is discharged from said reaction chamber.

2. Apparatus as defined in claim 1 in which the air inlet chamber of said carburetor has a cylindrical side wall portion and a side wall portion tapered inwardly below said cylindrical side wall portion and said air conduit is mounted tangentially on said cylindrical side wall portion of said carburetor.

3. Apparatus as defined in claim 2 in which said air-gas mixing chamber is lesser in cross section than the cylindrical side wall portion of said air inlet chamber.

4. Apparatus as defined in claim 3 in which said air-gas discharge conduit is lesser in cross section than said air-gas mixing chamber.

5. Apparatus as defined in claim 1 in which said reaction chamber comprises a steel shell having a cylindrical side wall portion at its lower end and an upwardly tapered conical portion above said lower cylindrical portion and a bottom wall, said tapered portion having an open upper top end, a removably mounted top wall plate capping said top end on which said carburetor is mounted, said plate having a central opening through which the air-gas discharge conduit of said carburetor extends, a liner of thermoinsulation material lining said steel shell providing a reaction chamber space of the same general shape as said steel shell, a foraminous cylindrical wall in the bottom portion of said reaction chamber confining catalyst mass and providing communication between said reaction chamber space and said reformed gas discharge conduit.

References Cited in the file of this patent

UNITED STATES PATENTS

| | | |
|---|---|---|
| 2,483,132 | Gaucher | Sept. 27, 1949 |
| 2,765,358 | Pichler et al. | Oct. 2, 1956 |
| 2,942,958 | Dwyer | June 28, 1960 |
| 2,943,062 | Mader | June 28, 1960 |
| 2,951,749 | Bartholome | Sept. 6, 1960 |

FOREIGN PATENTS

| | | |
|---|---|---|
| 192,380 | Austria | Oct. 10, 1957 |